(12) United States Patent
Lee et al.

(10) Patent No.: US 8,074,188 B2
(45) Date of Patent: Dec. 6, 2011

(54) METHOD FOR DESIGNING MASK INCLUDING FORMING A MESH DUMMY PATTERN

(75) Inventors: Sang Hee Lee, Eumseong-gun (KR); Gab Hwan Cho, Icheon-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 763 days.

(21) Appl. No.: 12/118,123

(22) Filed: May 9, 2008

(65) Prior Publication Data
US 2008/0282218 A1 Nov. 13, 2008

(30) Foreign Application Priority Data
May 10, 2007 (KR) .................. 10-2007-0045627

(51) Int. Cl.
*G06F 17/50* (2006.01)
(52) U.S. Cl. ............. 716/55; 716/50; 716/51; 716/52; 716/54; 716/56; 430/5; 430/30
(58) Field of Classification Search .......... 716/50, 716/51, 52, 53, 54, 55, 56; 430/5, 30
See application file for complete search history.

(56) References Cited

U.S. PATENT DOCUMENTS

| 5,595,843 | A | 1/1997 | Dao |
| 6,099,992 | A * | 8/2000 | Motoyama et al. ............. 430/5 |
| 6,421,820 | B1 | 7/2002 | Mansfield et al. |
| 2002/0087942 | A1 | 7/2002 | Kitada |
| 2004/0197677 | A1 | 10/2004 | Kohle et al. |
| 2006/0097399 | A1* | 5/2006 | Hatano et al. ............... 257/773 |
| 2008/0121939 | A1* | 5/2008 | Murray et al. ............... 257/202 |

FOREIGN PATENT DOCUMENTS

| JP | 10-256255 A | 9/1998 |
| JP | 2000-338646 A | 12/2000 |
| JP | 2001-324796 A | 11/2001 |
| JP | 2004-294664 A | 10/2004 |

* cited by examiner

*Primary Examiner* — Jack Chiang
*Assistant Examiner* — Nha Nguyen
(74) *Attorney, Agent, or Firm* — Saliwanchik, Lloyd & Eisenschenk (57) ABSTRACT

A method for designing a mask is disclosed. A chip region can be defined and reduced to form a parent dummy pattern. A mesh dummy pattern can be formed, and portions where the parent dummy pattern and the mesh dummy pattern overlap each other can be removed to form offspring dummy patterns.

9 Claims, 7 Drawing Sheets

METHOD FOR DESIGNING MASK INCLUDING FORMING A MESH DUMMY PATTERN

CROSS-REFERENCE TO RELATED APPLICATION

The present application claims the benefit under 35 U.S.C. §119 of Korean Patent Application No. 10-2007-0045627, filed May 10, 2007, which is hereby incorporated by reference in its entirety.

BACKGROUND

Generally, a semiconductor device has a multi-layered structure. Each of the layers constituting the multi-layered structure are generally formed using a deposition process or a sputtering process, and then patterned using a lithography process.

Since there are some limitations in the semiconductor device due to a difference in pattern size and pattern density of the layers of the semiconductor device on the substrate, methods where a main pattern and a dummy pattern are formed together are being developed.

BRIEF SUMMARY

Embodiments of the present invention provide a method for designing a mask. According to an embodiment, a dummy pattern can be provided having a new shape.

According to embodiments of the present invention, a method for designing a mask is provided that can secure uniformity of a pattern.

A method for designing a mask according to an embodiment can increase the pattern density of layers of a semiconductor device.

A method for designing a mask according to an embodiment can also simplify a design process and a manufacturing process of a semiconductor device.

In one embodiment, a method for designing a mask can include: defining a chip region; reducing the chip region to form a parent dummy pattern; forming a mesh dummy pattern; and forming offspring dummy patterns by removing portions of the parent dummy pattern and the mesh dummy pattern where they overlap each other.

In an embodiment, a method for designing a mask can include: defining a chip region; reducing the chip region to form a parent dummy pattern; forming first lines having a first width and second lines having a second width on the parent dummy pattern such that the first lines are approximately parallel to the second lines; forming third lines having a third width and fourth lines having a fourth width on the parent dummy patterns such that the third lines are approximately parallel to the fourth lines and approximately perpendicular to the first lines; performing an exclusive OR (XOR) operation on the second lines and the fourth lines to form a first pattern; reducing the width of the second lines and the fourth lines to form sixth lines and seventh lines, respectively, thereby forming a second pattern; and performing an AND operation on the first pattern and the second pattern to form offspring dummy patterns.

The details of one or more embodiments are set forth in the accompanying drawings and the description below. Other features will be apparent from the description and drawings, and from the claims.

DETAILED DESCRIPTION

Hereinafter, a method for designing a mask will be described with reference to the accompanying drawings.

In the description of embodiments, it will be understood that when a layer (or film) is referred to as being 'on' another layer or substrate, it can be directly on another layer or substrate, or intervening layers may also be present. Further, it will be understood that when a layer is referred to as being 'under' another layer, it can be directly under another layer, or one or more intervening layers may also be present. In addition, it will also be understood that when a layer is referred to as being 'between' two layers, it can be the only layer between the two layers, or one or more intervening layers may also be present.

According to an embodiment of the present invention, dummy patterns can be formed at desired positions over an entire chip level regardless of rotation or orientation of main pattern blocks inside a chip.

According to an implementation of the subject mask design, chip boundaries can be changed into a parent dummy pattern and then offspring dummy patterns can be formed using a mesh dummy pattern. This can be accomplished using any known software layout tools.

Figure 1A:
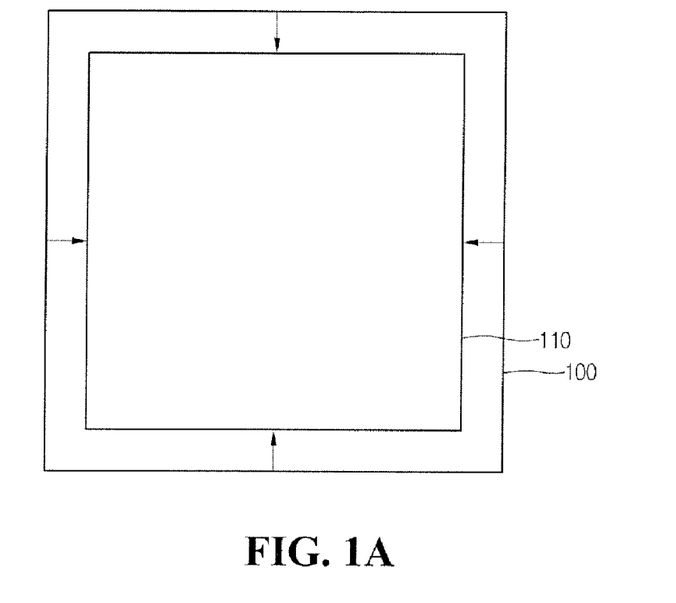
FIGS. 1A to 1E are conceptual views of a method for designing a mask according to an embodiment of the present invention.

Referring to FIG. 1A, a chip region 100 can be defined. Then, the chip region 100 can be reduced to form a parent dummy pattern 110.

The chip region 100 can be downsized by any suitable amount to form the parent dummy pattern 110. For example, the chip region 100 can be reduced by about 1 μm to form the parent dummy pattern 110.

Figure 1B:
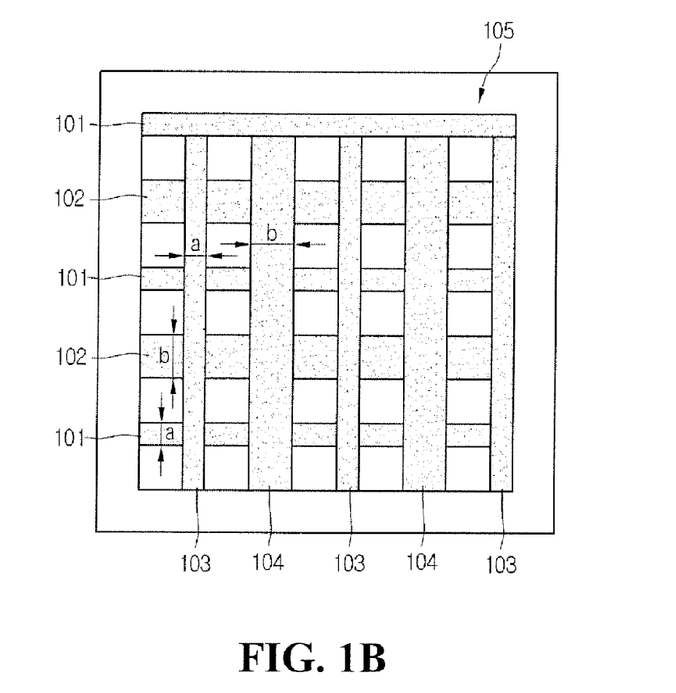

Referring to FIG. 1B, a mesh dummy pattern 105 can be formed.

Hereinafter, a method for forming the mesh dummy pattern 105 will be described in detail.

Forming the mesh dummy pattern can include forming first lines 101 having a first width (a) and second lines 102 having a second width (b) on the parent dummy pattern 110 such that the first lines 101 and second lines 102 are approximately parallel to each other.

The first width (a) of the first lines 101 can be the same as or different from the second width (b) of the second lines 102. For example, the first width (a) of the first lines 101 can be smaller than, larger than or the same size as the second width (b) of the second lines 102.

Next, third lines 103 having a third width and fourth lines 104 having a fourth width can be formed on the parent dummy pattern 110 such that the third lines 103 and fourth lines 104 are approximately parallel to each other and approximately perpendicular to the first lines 101.

Although the figures show the third width of the third lines 103 having the same width as the first width (a) of the first lines 101, embodiments are not limited thereto. In addition, although the figures show the fourth width of the fourth lines 104 having the same width as the second width (b) of the second lines 102, embodiments are not limited thereto.

For example, in certain embodiments, the third width of the third lines 103 can be different from the first width (a) of the first lines 101. Additionally, in certain embodiments, the fourth width of the fourth lines 104 can be different from the second width (b) of the second lines 102.

Through the above process, the mesh dummy pattern 105 including the first lines 101, the second lines 102, the third lines 103, and the fourth lines 104 can be formed.

Figure 1C:
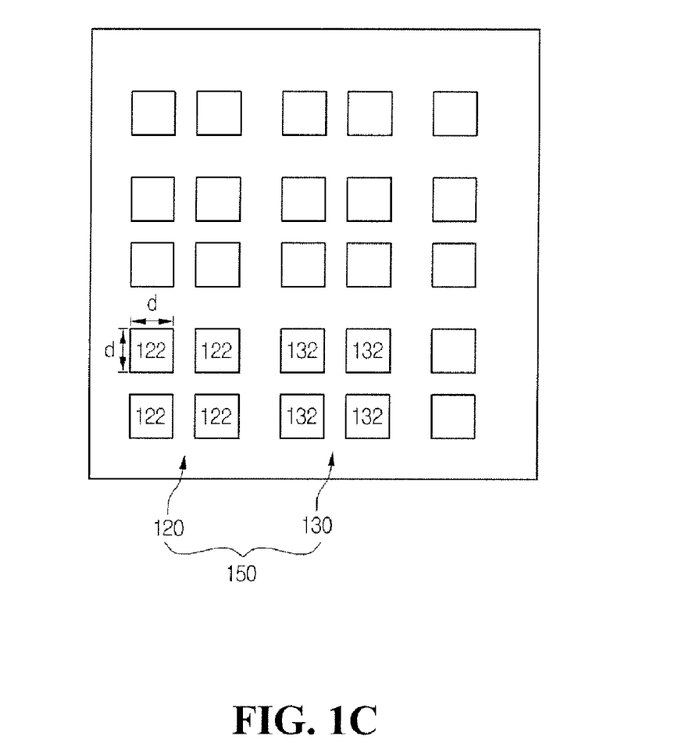

Next, referring to FIG. 1C, offspring dummy patterns 150 can be formed by removing portions where the parent dummy pattern 110 and the mesh dummy pattern 105 overlap.

In one embodiment, the offspring dummy patterns 150 can be square patterns having a fifth width d.

In an embodiment, the offspring dummy patterns 150 can include a first group of offspring dummy patterns 120 including a plurality of first offspring patterns 122 separated from each other by a distance of the third width and the first width (a).

Additionally, the offspring dummy patterns 150 can include a second group of offspring dummy patterns 130 including a plurality of second offspring patterns 132 separated by the fourth width (b) from the first group of offspring dummy patterns 120.

Figure 1D:
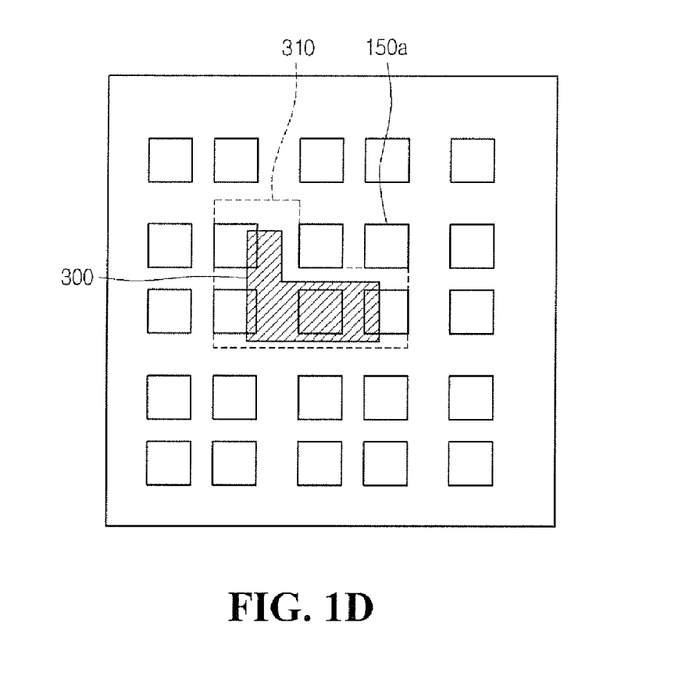

Referring to FIG. 1D, a main pattern 300 can be formed inside the chip region 100, and a dummy pattern prohibition region 310 can be formed using the main pattern 300 as a reference.

Figure 1E:
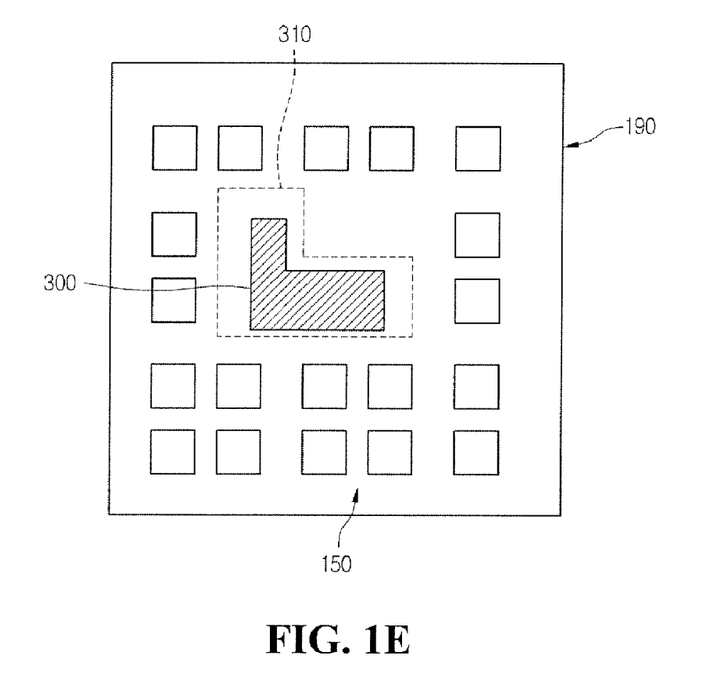

Referring to FIG. 1E, a first mask 190 can be provided by removing offspring dummy patterns 150a (shown in FIG. 1D) contacting the dummy pattern prohibition region 310.

In one embodiment, the offspring dummy patterns 150 can be active dummy patterns. In other embodiments, the offspring dummy patterns 150 are not active dummy patterns.

According to embodiments of the present invention, dummy patterns can be formed at desired positions over an entire chip level regardless of rotation or orientation of a main pattern block inside the chip.

Also, according to the embodiment, a main pattern can be formed and a dummy pattern prohibition region can be defined. Then chip boundaries can be changed into pattern dummies and then sliced to remove the dummy patterns on the dummy pattern prohibition region, so that dummy patterns can be collectively inserted at desired positions over an entire chip level.

According to embodiments, because the dummy patterns can be collectively provided at desired positions over the entire chip level, the uniformity of the patterns can be increased.

According to embodiments of the present invention, by collectively inserting dummy patterns at desired positions over the entire chip level, data burden for designing the dummy patterns can be minimized.

Moreover, according to embodiments of the present invention, since uniformity of the patterns can be secured, the constant critical diameter (CD) of each pattern can be more easily obtained.

Forming dummy patterns according to embodiments of the subject layout method at desired positions over the entire chip level can also simplify a design process and a manufacturing process.

FIGS. 2A to 2G are conceptual views of a method for designing a mask according to an embodiment of the present invention.

Although an example of poly dummy patterns is described herein, embodiments of the present invention are not limited thereto.

Figure 2A:
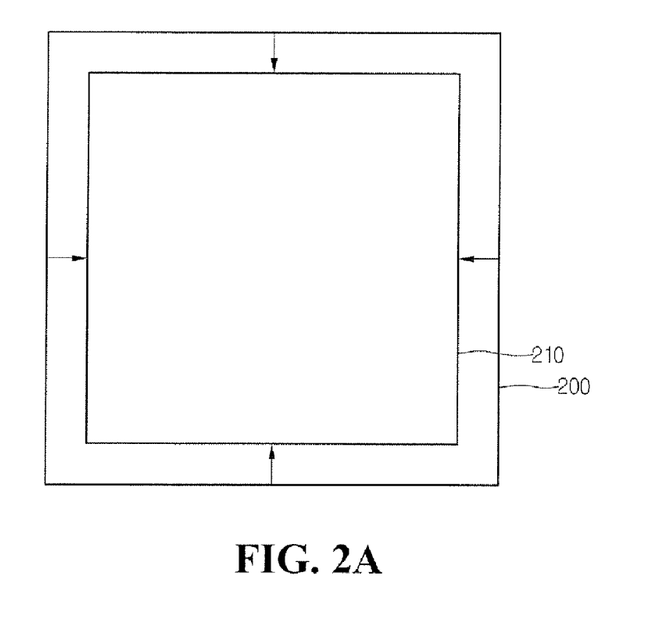
FIGS. 2A to 2G are conceptual views of a method for designing a mask according to an embodiment of the present invention.

Referring to FIG. 2A, a chip region 200 can be defined, and the chip region 200 can be reduced to form a parent dummy pattern 210.

The chip region 200 can be downsized by any suitable amount to form the parent dummy pattern 210. For example, the chip region 200 can be reduced by about 1 μm to form the parent dummy pattern 210.

Figure 2B:
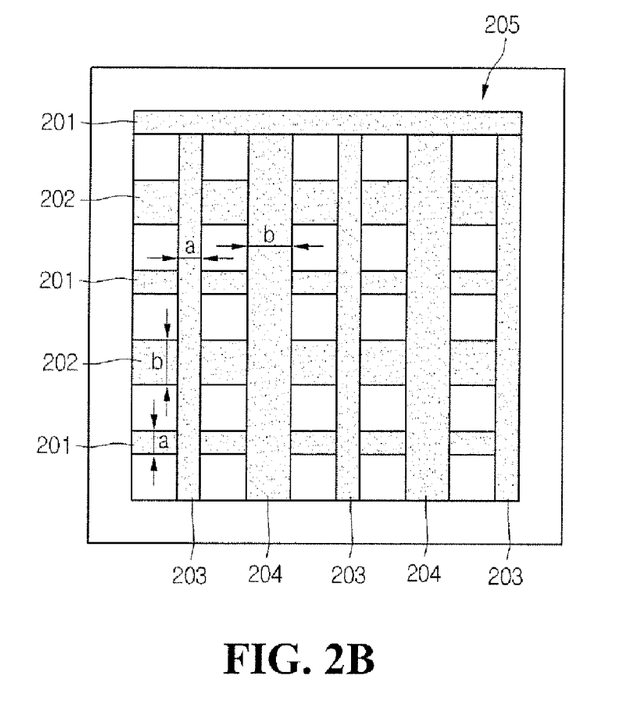

Next, referring to FIG. 2B, a mesh dummy pattern 205 can be formed.

Hereinafter, a method for forming the mesh dummy pattern 205 will be described in detail.

First lines 201 having a first width (a) and second lines 202 having a second width (b) can be formed on the parent dummy pattern 210 such that the first lines 201 and the second lines 201 are approximately parallel to each other.

The first width a of the first lines 201 can be the same as or different from the second width b of the second lines 202. For example, the first width a of the first lines 201 can be smaller than, larger than or the same size as the second width b of the second lines 202.

Next, third lines 203 having a third width and fourth lines 204 having a fourth width can be formed on the parent dummy pattern 210 such that the third lines 203 and the fourth lines 204 are approximately parallel to each other and approximately perpendicular to the first lines 201.

Although the figures show the third width of the third lines 203 having the same width as the first width (a) of the first lines 101, embodiments are not limited thereto. In addition, although the figures show the fourth width of the fourth lines 204 having the same width as the second width (b) of the second lines 202, embodiments are not limited thereto. For example, in certain embodiments, the third width of the third lines 203 can be different from the first width (a) of the first lines 201. Additionally, in certain embodiments, the fourth width of the fourth lines 204 can be different from the second width (b) of the second lines 202.

Through the above process, the mesh dummy pattern 205 including the first lines 201, the second lines 202, the third lines 203, and the fourth lines 204 can be formed.

Figure 2C:
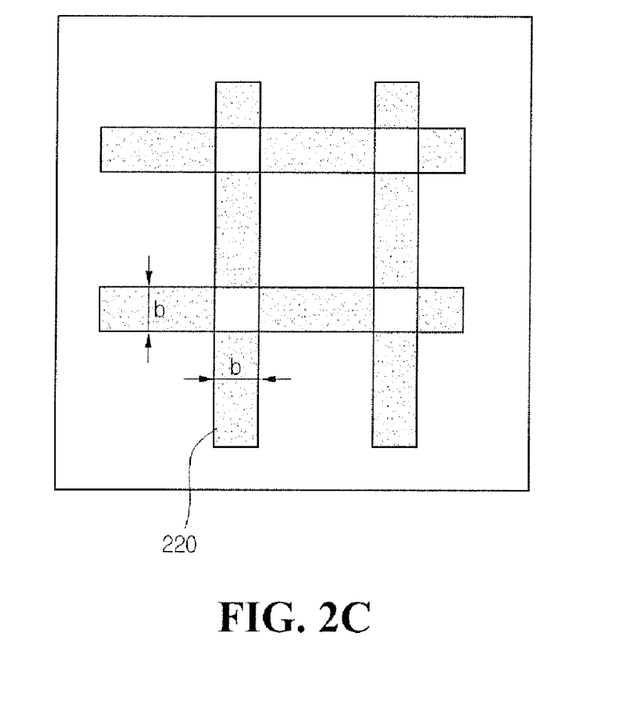

Next, referring to FIG. 2C, an exclusive "OR" (XOR) operation can be performed on the second lines 202 and the fourth lines 204 to form a first pattern 220.

That is, the first pattern 220 can be formed by removing portions of the second lines 202 and the fourth lines 204 where they overlap each other.

Figure 2D:
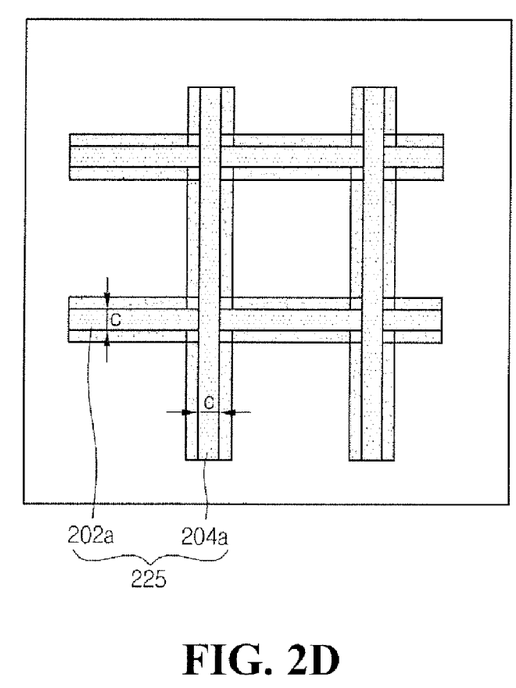

Then, referring to FIG. 2D, sixth lines 202a and seventh lines 204a can be formed by decreasing the width of the second lines 202 and the fourth lines 204, respectively. Accordingly, a second pattern 225 can be formed.

Figure 2E:
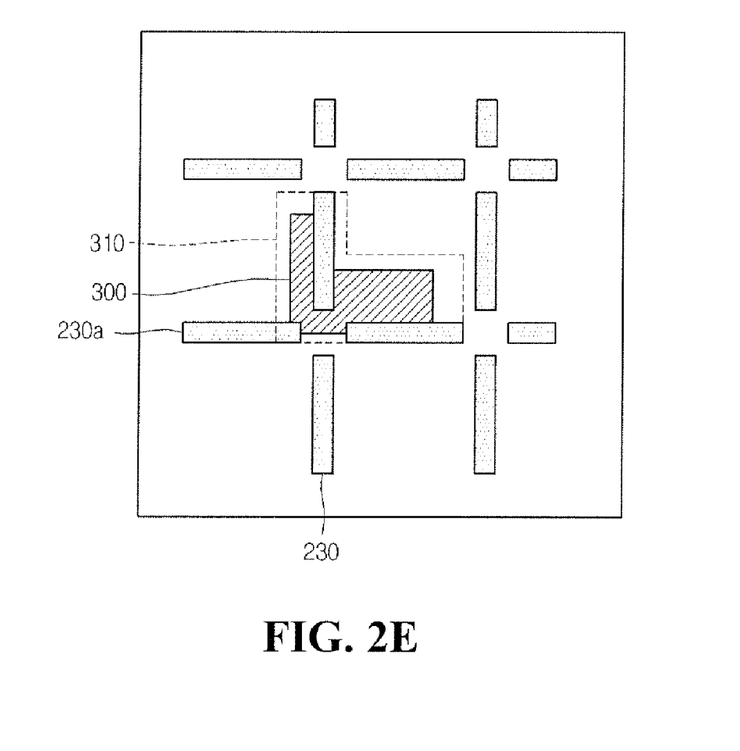

Next, referring to FIG. 2E, an "AND" operation can be performed on the first pattern 220 and the second pattern 225 to form offspring dummy patterns 230.

In an embodiment, the offspring dummy patterns 230 can be formed by leaving only portions of the first pattern 220 and the second pattern 225 where they overlap each other.

Then, a main pattern 300 can be formed inside the chip region 200, and a dummy pattern prohibition region 310 can be formed using the main pattern 300 as a reference.

Offspring dummy patterns 230a contacting the dummy pattern prohibition region 310 can be removed.

Figure 2F:
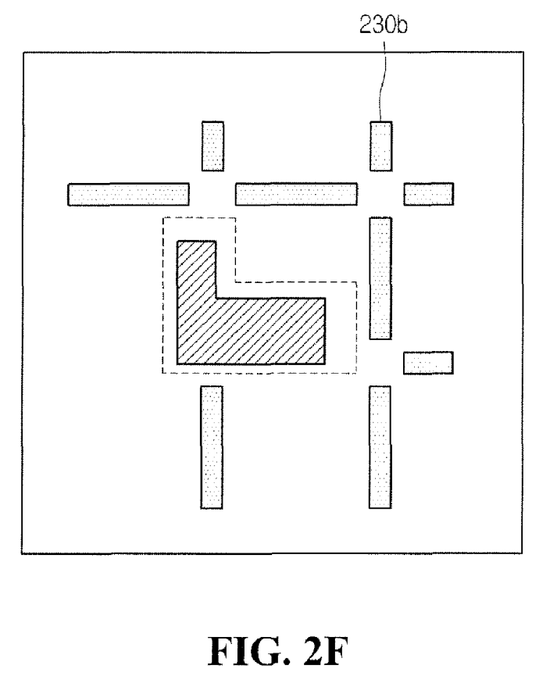
Figure 2G:
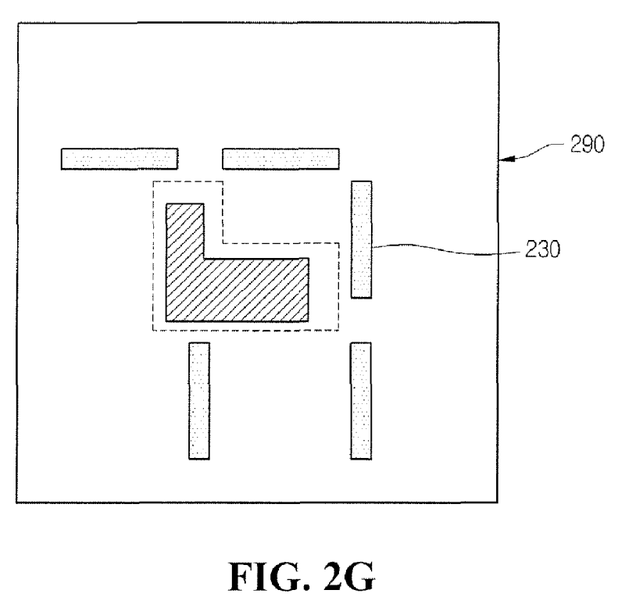

Next, referring to FIGS. 2F and 2G, a second mask 290 including offspring dummy patterns 230 can be completed by removing offspring dummy patterns 230b of less than a minimum size.

According to embodiments of the present invention, dummy patterns can be formed at desired positions over an entire chip level regardless of rotation or orientation of a block inside the chip.

Also, chip boundaries can be changed into dummies and then sliced to remove dummy patterns of the dummy pattern prohibition region, so that dummy patterns can be formed at desired positions over the entire chip level.

Furthermore, embodiments of the subject layout method can increase uniformity of the patterns.

Additionally, embodiments of the subject layout method can minimize the data burden for designing the dummy patterns.

Moreover, according to embodiments of the present invention, since uniformity of the patterns can be secured, the constant critical diameter (CD) of each pattern can be more easily obtained.

Forming dummy patterns according to embodiments of the subject layout method can also simplify a design process and a manufacturing process.

Figure 3A:
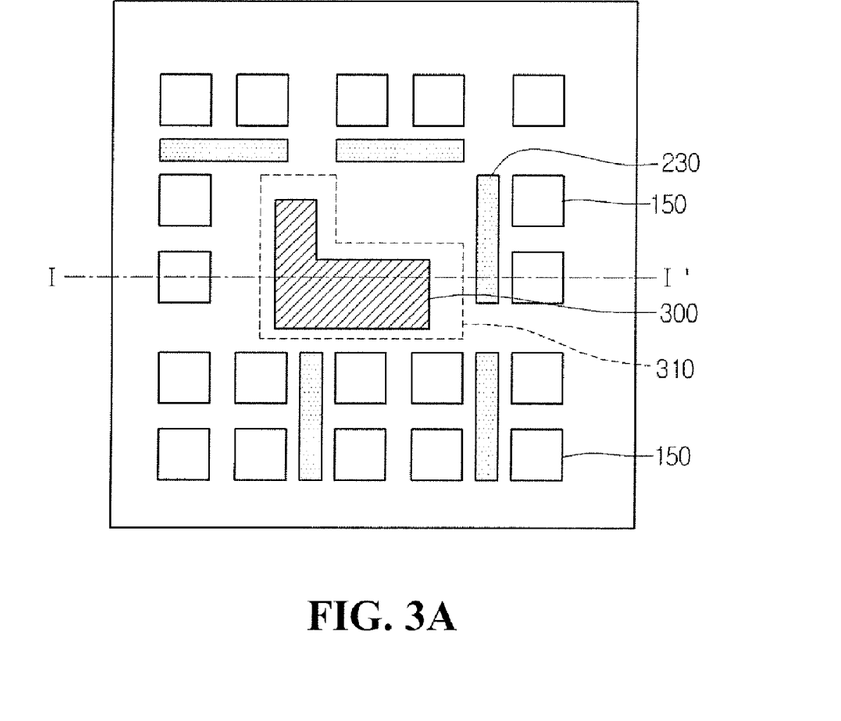
FIG. 3A is a plan view of a semiconductor device according to an embodiment of the present invention.
Figure 3B:
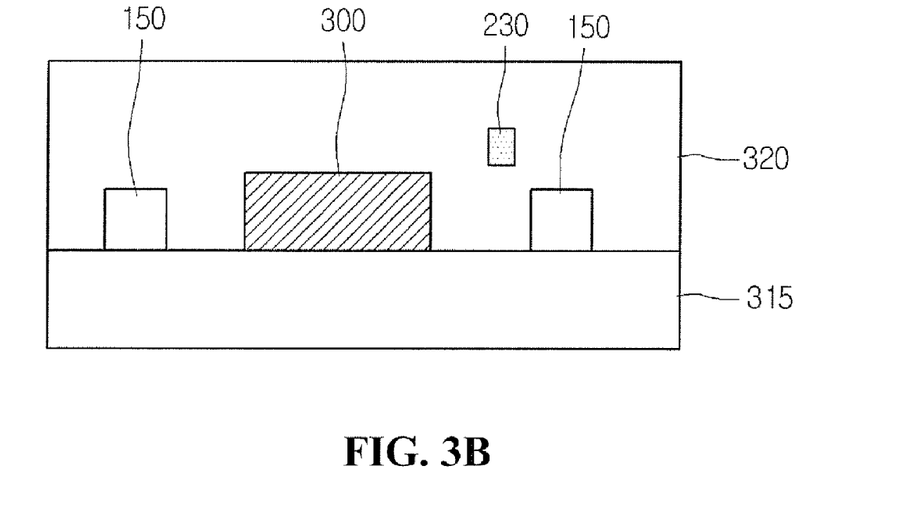
FIG. 3B is a cross-sectional view, taken along line I-I' of FIG. 3A, of a semiconductor device according to an embodiment of the present invention.

Referring to FIGS. 3A and 3B, a semiconductor device according to an embodiment of the present invention can be formed using the first mask 190 prepared according to an embodiment of the subject mask design method and the second mask 290 prepared according to an embodiment of the subject mask design method.

For example, a main pattern 300 (for an active region of the substrate 315) and active layer offspring dummy patterns 150 can be formed on a substrate 315 using the first mask 190.

Then, an interlayer dielectric 320 can be formed, and a poly-offspring dummy pattern 230 can be formed using the second mask 290.

Characteristics of the mask design process according to embodiments of the present invention can be included in processes of manufacturing the semiconductor device.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for designing a mask, comprising:
    defining a chip region using a computer;
    forming a parent dummy pattern on a portion of the chip region;
    forming a mesh dummy pattern on the parent dummy pattern; and
    forming offspring dummy patterns by removing portions of the parent dummy pattern and portions of the mesh dummy pattern where they overlap each other,
    wherein forming the mesh dummy pattern comprises:
        forming first lines having a first width and second lines having a second width on the parent dummy pattern such that the first lines are approximately parallel to the second lines; and
        forming third lines having a third width and fourth lines having a fourth width on the parent dummy pattern such that the third lines are approximately parallel to the fourth lines and approximately perpendicular to the first lines,
    wherein the first width is different from the second width.

2. The method according to claim 1, wherein the third width is different from the fourth width.

3. The method according to claim 1, wherein the third width is the same as the first width, and wherein the fourth width is the same as the second width.

4. The method according to claim 1, wherein the offspring dummy patterns comprise regular square patterns.

5. The method according to claim 1, wherein the offspring dummy patterns comprise:
    a first group of offspring dummy patterns comprising a plurality of first offspring dummy patterns separated from each other by a distance of the first width; and
    a second group of offspring dummy patterns comprising a plurality of second offspring dummy patterns separated from the first group of offspring dummy patterns by a distance of the second width.

6. The method according to claim 1, wherein the offspring dummy patterns comprise active layer dummy patterns.

7. The method according to claim 1, further comprising:
    forming a main pattern inside the chip region;
    forming a dummy pattern prohibition region using the main pattern as a reference; and
    removing offspring dummy patterns that are in contact with the dummy pattern prohibition region.

8. The method according to claim 7, wherein the forming of the main pattern and the forming of the dummy pattern prohibition region are performed before the forming of the parent dummy pattern.

9. The method according to claim 7, wherein the forming of the main pattern and the forming of the dummy pattern prohibition region are performed after the forming of the parent dummy pattern.

* * * * *